April 3, 1934.                E. J. GRANT                1,953,299
APPARATUS FOR CUTTING MATERIALS
Original Filed Dec. 1, 1928    2 Sheets-Sheet 1
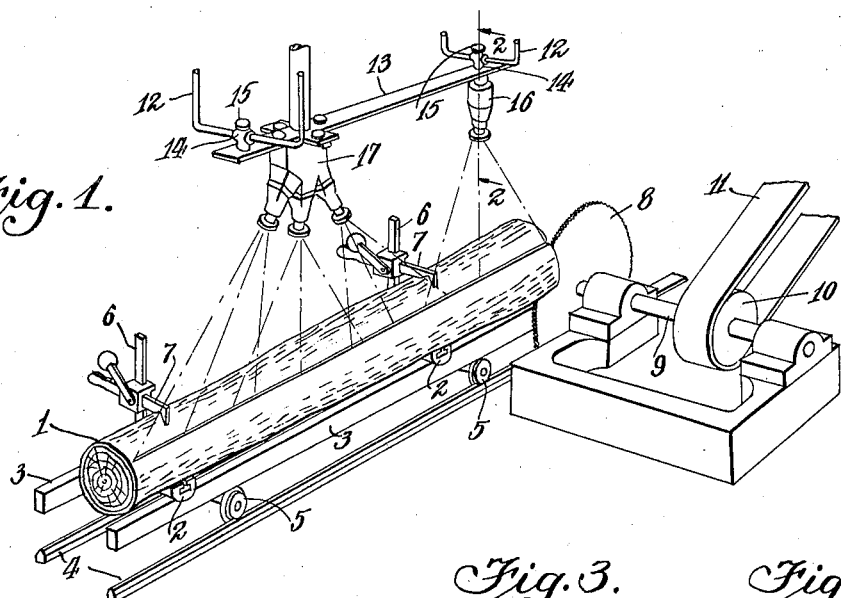
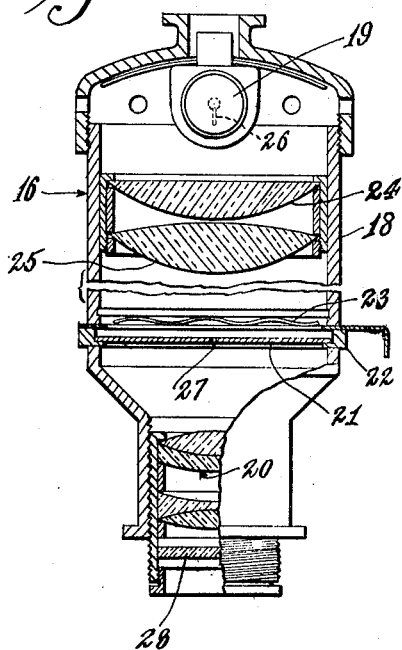
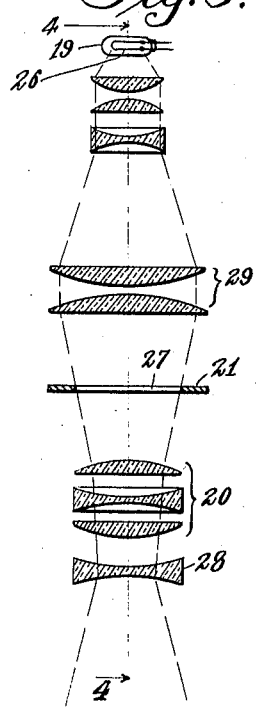
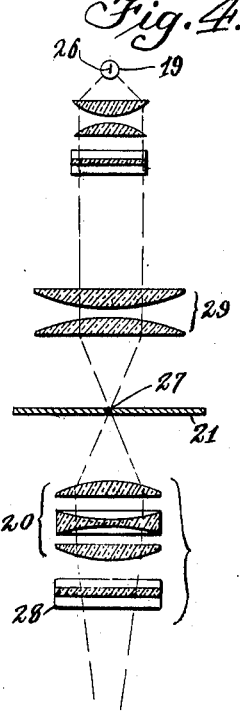
Inventor
Edwin J. Grant
By Lyon & Lyon
Attorneys April 3, 1934.  E. J. GRANT  1,953,299
APPARATUS FOR CUTTING MATERIALS
Original Filed Dec. 1, 1928  2 Sheets-Sheet 2

Inventor
Edwin J. Grant
By Lyon & Lyon
Attorneys

Patented Apr. 3, 1934

1,953,299

UNITED STATES PATENT OFFICE 1,953,299

APPARATUS FOR CUTTING MATERIALS

Edwin J. Grant, Los Angeles, Calif.

Original application December 1, 1928, Serial No. 323,080. Divided and this application May 28, 1929, Serial No. 366,725

7 Claims. (Cl. 88—24)

This invention relates to apparatus for cutting materials, and more particularly relates to means for projecting an intense uniform narrow light boundary, such as a light beam, upon material to be cut, said light boundary or light beam being preferably coordinated with a cutting means so as to bear a predetermined relation when projected upon the material to be cut, to said cutting means.

This is a divisional application of my previous application, Serial Number 323,080, filed December 1, 1928, which has become U. S. Patent No. 1,804,080, May 12, 1931, and relating to Apparatus for and method of cutting material.

In the cutting of lumber and other materials, it is desirable to be able to visually observe upon the material to be cut, the plane or points through which the cutting means will travel during the cutting operation. For example, in slabbing logs, the log is moved into cutting relation with a stationary cutting means, and it is desirable that a slab be cut from the log, said slab paralleling the heart-wood or at a slight angle thereto so as to produce a square timber.

It is difficult to estimate the position of the saw with respect to the surface of the log, and the operator often makes the initial cut in a plane not parallel to the surface of the log, that is, a wedge-shaped board or slab is cut and a triangular surface is exposed on the log. Furthermore, the log often misses the saw entirely, thereby causing an appreciable loss of time. If, on the other hand, the cut is too deep quantities of lumber are wasted.

The above is merely one illustration of a cutting operation during which it is desirable to know through which points on the material to be cut a cutting means will pass. Numerous other cutting, sawing and shearing operations are facilitated by the use of the method described in the previous application, Serial Number 323,080 mentioned hereinabove. Attempts have been made heretofore to cast a shadow or a light boundary upon material to be cut. For example, attempts have been made to position a wire or narrow rod between a light source and the material to be cut, so as to cast a light boundary upon the material to be cut. Shadows produced in this manner have been entirely unsatisfactory. When these prior devices are employed, the shadows cast upon material to be cut are very indefinite, and the edges of said shadows are blurred. The shadows are, furthermore, very wide as the shadow producing element, such as a wire, needs be suspended an appreciable distance above the material to be cut in order not to interfere with the cutting operation and the movement of materials in the logging plant, remanufacturing plant or other workrooms.

For these reasons, the devices of the prior art have not been commercially successful, and at the present time are not being employed.

An object of this invention is to provide a device by means of which an intense narrow light beam or boundary may be cast upon material to be cut.

Another object is to disclose and provide an apparatus capable of projecting a definitely shaped light boundary upon material to be cut. Another object is to disclose and provide an arrangement of lenses by means of which light may be concentrated and projected in the form of a narrow intense beam.

A still further object is to disclose and provide an apparatus adapted to project a narrow light beam upon material to be cut from a point at an appreciable distance away from the material to be cut.

It is to be understood that the device embraced by this invention is preferably used in conjunction with the apparatus and in carrying out the method disclosed in my prior application mentioned hereinabove.

In describing the invention, reference will be had to the appended drawings, in which:

Fig. 1 is a perspective view of a cutting apparatus adapted to slab logs, one of which is indicated in position upon a carriage, certain portions of the mechanism for operating the carriage and for moving the log on the carriage having been omitted as these are well understood in the art.

Fig. 2 is an enlarged section, taken along a vertical plane, through the single beam projector shown in Fig. 1.

Fig. 3 is a diagrammatic representation of one form of lens system which may be employed in the device embraced by this invention.

Fig. 4 is a section through the lens system shown in Fig. 5, said section being taken along a plane indicated at 4—4 in Fig. 3.

Figure 5:
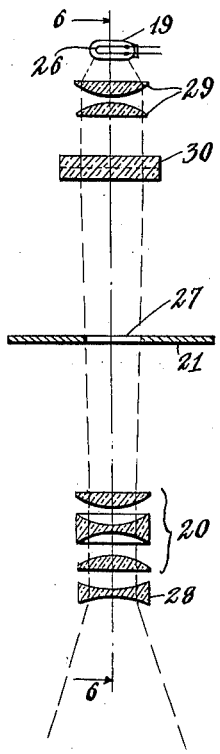
Fig. 5 is a diagrammatic representation of a modified form of lens system.

In the sliding apparatus shown in Fig. 1, the log 1 may be mounted upon a traveling carriage consisting of head blocks 2 connected by means of a frame 3, said frame being movably mounted so as to run upon longitudinal guide rails 4, as by means of wheels 5.

The head blocks 2 bear knees 6 which are movable transversely of the carriage and which may be adjustably positioned thereon. Means for moving the knees 6 are not shown, as such means are well known in the art. The knees generally carry dogs 7 which are adjustably mounted upon the knees 6, and which are used to hold the log 1 in position upon the traveling carriage or head blocks 2.

The cutting member adapted to operate upon the log 1 may consist of a large circular saw 8 mounted on a shaft 9 passing through suitable bearings in a suitable framework or bed, the shaft 9 being driven in any suitable manner, as, for example, by means of a pulley 10 mounted thereon and a belt 11 driven from a source of power, not shown. The saw 8 is so positioned as to rotate in a plane parallel to the tracks 4 and adapted to barely miss the outer ends of the head blocks 2.

Suspended above the traveling carriage and rails in any suitable manner, as, for example, by means of the brackets 12 hung from a ceiling or other supporting structure, there may be a projector support 13; the projector support 13 may be adjustable transversely to the path of the material to be cut, namely, the log 1, by means of eyes 14 connected to the projector support 13, said eyes 14 being slidably mounted on the brackets 12 and provided with means 15 for adjustably locking the eyes in position upon the brackets 12.

One or more projectors 16 may be suspended from the support 13. As shown in Fig. 1, a single projector 16 may be used and a tri-beam projector 17 may also be employed. The projectors 16 and 17 may be so mounted with respect to the carriage 3 as to have the vertical axes passed through the projectors 16 and 17 at ninety degrees to the plane of said carriage or guide rails 4, or said projectors 16 and 17 may be slightly inclined thereto.

The projectors 16 and 17 may project points, lines or other definitely shaped beams of light or light boundaries upon the log 1, the projected beams of light from the projectors 16 and 17 being in alignment upon the log with the cutting planes of the saw 8 or other cutting means.

Details of construction of the single beam projector 16 are shown in Fig. 2. The device may comprise an outer housing 18 having a suitable light source 19 mounted therein. Any suitable projecting lens system, such as the lens system 20, may be adjustably mounted in the wall of the housing 18. An aperture plate 21 is preferably positioned within the housing 18. The aperture plate 21 may be mounted in a frame 22 adapted to be adjustably positioned within the housing 18 in any suitable manner.

A spring 23 may be carried by the frame 22 of the aperture plate 21, or by the housing 18 so as to retain the frame 22 and aperture plate 21 within the housing, and still permit the withdrawal of said plate and the adjustment of said plate and frame within the housing 18.

Between the light source 19 and the aperture plate, any suitable condensing lens system, such as a condensing lens system comprising plano-convex lens 24 and a lens 25, may be positioned. Preferably, the light source 19 is a single filament lamp having a rather long filament. The filament 26 of the light source 19 is preferably parallel to the aperture 27 in the aperture plate 21, so that the condensing lens 24 and 25 concentrate the light from said filament 26 upon the aperture 27. The light from the aperture 27 is then projected through the projecting lens system 20, and means may be provided for extending or lengthening the beam of light emanating from the aperture 27.

Such means may comprise a double concave cylindrical lens 28, operably mounted exteriorly of the projecting lens system 20. The axis of the double concave cylindrical lens 28 is preferably perpendicular to the longitudinal axis of the aperture 27.

The lens system described hereinabove is diagrammatically illustrated in Figs. 3 and 4.

In Figs. 3 and 4, the condensing lens system comprises a pair of plano-convex lenses 29, whereas the condensing lens system illustrated in Fig. 2 comprised a plano-convex lens 24 and a lens 25 which presents a spherical surface towards the lens 24 and an aspheric surface toward the projection lens system. Furthermore, the projecting lens system shown in Figs. 3 and 4 differs somewhat from the projection lens system shown in Fig. 2.

It is to be understood that any suitable condensing lens system and any suitable projection lens system may be employed in the aparatus. It is desirable, however, in all instances to employ a cylindrical lens of the character indicated at 28, for diverging and lengthening the beam of light which is projected from the aperture 27 through the projection lens system. The relation of the cylindrical lens 28 to the longitudinal axis of the aperture 27 is well shown in Figs. 3 and 4.

Figure 6:
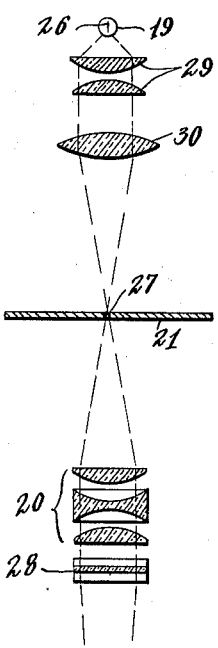
Fig. 6 is a section taken along line 6—6 in Fig. 5.

A modified form of lens system is shown in Figs. 5 and 6. As shown in these figures, the lens system may comprise condensor lenses 29, a cylindrical double convex lens 30, a projection lens system 20, and a double concave cylindrical lens 28.

Figure 7:
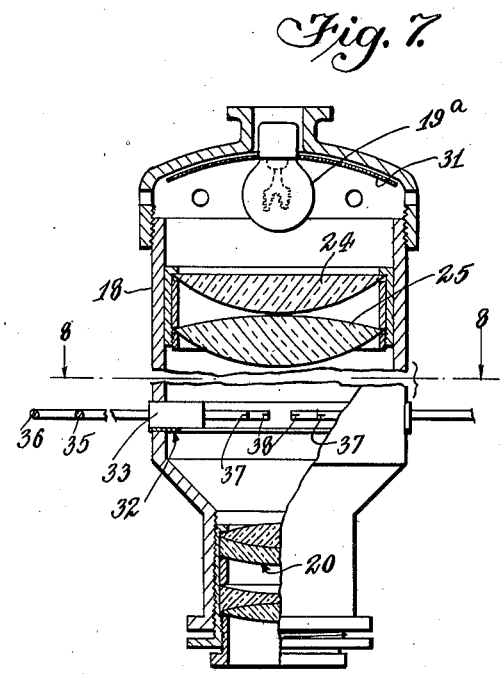
Fig. 7 is a vertical section through a modified form of the apparatus and projector.
Figure 8:
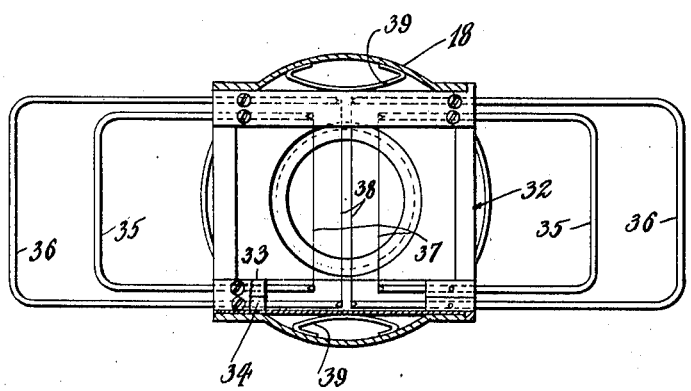
Fig. 8 is a plan view of a light grating adapted to be used in the modified projector shown in Fig. 7.

It may be desirable to project a plurality of spaced light boundaries instead of a single intense beam of light such as is obtained when using the aperture plate 21. A projection device capable of producing a plurality of definite light boundaries is shown in Figs. 7 and 8. Fig. 7 is a vertical section, partly broken away, through a device of this character. The device comprises a housing 18 in which is mounted a suitable light source 19a. This light source need not be a single filament lamp of the character shown in Fig. 2. Preferably a reflector 31 is positioned back of the light source. Any suitable condensing lens system may be mounted within the housing 18 as, for example, a condensing lens system comprising the lenses 24 and 25. A projection lens system 20 may also be mounted in the apparatus in alignment with the condensor lenses 24 and 25. A suitable grid may then be positioned within the housing between the condensor lens and the projection lenses.

One form of adjustable grid is illustrated in Figs. 7 and 8, and may include a frame 32 carrying tubular members 33 and 34. Extending through the tubular members 33 and 34 U-shaped carrier members 35 and 36 may be slidably positioned, the ends of the U-shaped carrier members 35 and 36 carrying wires or other delineating members 37 and 38, respectively.

By adjusting the carrier members 35 and 36 within the sleeves or tubes 33 and 34, the wires 37 and 38 may be adjusted relatively to each other. The entire frame 32 may be retained within the housing 18 by means of springs 39 carried by the housing. Any suitable form of light grating may be employed. For example, instead of the device specifically illustrated in Figs. 7 and 8, a glass plate having opaque and transparent portions thereon may be introduced. Any of the devices of similar character, such as for example, those included in my application Serial Number 351,-692, filed April 1, 1929, and which has become U. S. Patent No. 1,916,567, July 4, 1933, may be employed.

A device of the character shown in Figs. 7 and 8 will, therefore, project a plurality of light boundaries or lines in spaced relation, said light boundaries representing dark or shadow lines caused by the wires 37 and 38 upon an intensely illuminated field.

It is to be understood that numerous changes and modifications may be made in the apparatus without departing from the spirit of the invention, which is particularly directed to an apparatus for projecting light boundaries and including means for concentrating light upon a delineating element, and means for projecting the light thus delineated. All the changes and modifications which come within the scope of the appended claims are, therefore, to be embraced thereby.

I claim:

1. In an apparatus for cutting material, means for projecting a narrow beam of light upon material to be cut, comprising a housing, a source of light within said housing, an aperture plate in said housing, means for concentrating light from said light source upon an aperture in said aperture plate, and means for projecting the light from said aperture and lengthening said light in one direction only.

2. In an apparatus for cutting materials, means for projecting a definitely shaped beam of light upon material to be cut, comprising a source of light, a condenser lens, an aperture plate provided with a slot, and a projector lens system having a bi-concave cylindrical lens with its axes of curvature transverse to said slot.

3. An apparatus for projecting a line of light, comprising a source of light, a condenser lens system including a bi-convex cylindrical lens, an aperture plate and a projector lens system having the bi-concave cylindrical lens transverse to said aperture slot.

4. An apparatus for projecting a line of light, including a housing, a source of light within said housing, a projector lens system mounted in the wall of said housing, an aperture plate in said housing, a condenser lens between said light source and aperture plate, and a bi-concave cylindrical lens positioned with its axis perpendicular to the longitudinal axis of an aperture in said aperture plate mounted exteriorly of said projection lens.

5. An apparatus for projecting an intense narrow beam of light, comprising a housing, a projection lens system mounted in the wall of said housing, an aperture plate in said housing, a filament lamp in said housing, said lamp being provided with a filament substantially parallel to the longitudinal axis of an aperture in said aperture plate, a condenser lens between said lamp and the aperture plate, and a bi-concave cylindrical lens mounted exteriorly of said projection lens, the axis of curvature of said cylindrical lens being transverse to said aperture.

6. An apparatus for projecting a narrow intense beam of light, comprising a housing, a projection lens system mounted in the wall of said housing, an aperture plate in said housing, a filament lamp in said housing, said lamp being provided with a filament substantially parallel to the longitudinal axis of an aperture in said aperture plate, a condenser lens between said lamp and aperture plate, and a bi-concave cylindrical lens positioned with its axis substantially perpendicular to the longitudinal axis of an aperture in said aperture plate mounted exteriorly of said projection lens.

7. In combination with cutting means and apparatus for moving material into cutting relation with said cutting means: means for projecting sharply delineated light boundaries upon material to be cut comprising a housing, a source of light within said housing, a delineating means within said housing, lens means for concentrating light from said light source upon said delineating means, and lens means for projecting said light boundaries from said delineating means upon material to be cut.

EDWIN J. GRANT.